United States Patent [19]
Albrecht et al.

[11] Patent Number: 5,798,425
[45] Date of Patent: Aug. 25, 1998

[54] CO-POLYMERS BASED ON OXYALKYLENEGLYCOL ALKENYL ETHERS AND UNSATURATED DICARBOXYLIC ACID DERIVATIVES

[75] Inventors: Gerhard Albrecht, Trostberg; Josef Weichmann, Pleiskirchen; Johann Penkner, Tacherting; Alfred Kern, Kirchweidach, all of Germany

[73] Assignee: SKW Trostberg Aktiengesellschaft, Trostberg, Germany

[21] Appl. No.: 628,057

[22] Filed: Apr. 8, 1996

[30] Foreign Application Priority Data

Apr. 7, 1995 [DE] Germany .............. 195 13 126.6

[51] Int. Cl.$^6$ .............. C08F 222/06; C08F 230/08; C08F 222/02; C08F 216/14
[52] U.S. Cl. .............. 526/271; 526/333; 526/279; 526/318.2
[58] Field of Search .............. 526/333, 271, 526/279, 318.2

[56] References Cited

U.S. PATENT DOCUMENTS

| | | | |
|---|---|---|---|
| 4,892,916 | 1/1990 | Hawe et al. | 526/304 |
| 5,162,402 | 11/1992 | Ogawa et al. | 524/5 |
| 5,358,566 | 10/1994 | Tanaka et al. | 106/823 |
| 5,369,198 | 11/1994 | Albrecht et al. | 526/240 |
| 5,612,396 | 3/1997 | Valenti et al. | 524/5 |

FOREIGN PATENT DOCUMENTS

| | | | |
|---|---|---|---|
| 0285951 | 9/1988 | European Pat. Off. | |
| 0373621 | 6/1990 | European Pat. Off. | |
| 0379676 | 8/1990 | European Pat. Off. | |
| 0537870 | 4/1993 | European Pat. Off. | |
| 0560602 | 9/1993 | European Pat. Off. | C04B 24/26 |
| 0604536 | 6/1994 | European Pat. Off. | |
| 0610699 | 8/1994 | European Pat. Off. | |
| 1646524 | 9/1963 | Germany. | |
| 2403444 | 8/1975 | Germany. | |
| 4034708 | 5/1991 | Germany | C08F 20/00 |
| 4142388 | 7/1992 | Germany. | |
| 4304109 | 8/1994 | Germany. | |
| 4445569 | 6/1995 | Germany. | |

OTHER PUBLICATIONS

Chemical Abstracts, vol. 101, 1984, p. 80, 101:25094a Anti-fogging agents, Nippon Shokubai Kagaku Kogyo Co. Ltd., Jpn. Kokai Tokkyo Koho JP 59 12,985[84 12,985], 23 Jan. 1984.

Chemical Abstracts, 51–Fossil Fuels, vol. 100, 1984, p. 159 100:123919x Dispersing agents for coal-water slurries, Nippon Shokubai Kagaku Kogyo Co. Ltd., Jpn. Kokai Tokkyo Koho JP 58,216,729 [83,216,729],16 Dec. 1983.

Chemical Abstracts, 46–Surface-Active Agents, vol. 110, 1989, p. 147, 110:78108a Polyoxyalkylene allylphenyl ether sulfo-succinates as surfactants, Yokota, K.; Ichihara, A. (Daiichi Kogyo Seiyaku Co. Ltd.), Jpn. Kokai Tokkyo Koho JP 63 23,727 [88 23,727], 1 Feb. 1988.

Chemical Abstracts, 46–Surface-Active Agents, vol. 99, 1983 p. 113, 99:177872f Builders for detergemts, Nippon Shokubai Kagaku Kogyo Co. Ltd., Jpn. Kokai Tokkyo Koho JP 57 47,099 [83 47,099] 18 Mar. 1983.

Chemical Abstracts, 35–Synthetic High Polymers, vol. 122, 1995 p. 21, 122:188456t Reactive emulsifiers for polymerization of vinyl compounds, Onodera, S.; Yamamoto, S.; Tamai, T.; Takahashi, H.; (Nipon Oils & Fats Co Ltd), Jpn. Kokai Tokkyo Koho JP 06,239,908 [94,239,908], 30 Aug. 1994.

*Primary Examiner*—Joseph L. Schofer
*Assistant Examiner*—Wu C. Cheng
*Attorney, Agent, or Firm*—Felfe & Lynch

[57] ABSTRACT

Disclosed is a co-polymer based on oxyalkyleneglycol alkenyl ethers and unsaturated dicarboxylic acid derivatives, as well as vinylic polyalkyleneglycol, polysiloxane or ester compounds. These co-polymers can be used as additives for hydraulic binding agents, especially cement. The co-polymers of the invention have an excellent and long-lasting liquefying action without introducing large amounts of air pores into the binding agent mixtures, thereby preventing the loss of strength and stability of the hardened building materials.

11 Claims, No Drawings

CO-POLYMERS BASED ON OXYALKYLENEGLYCOL ALKENYL ETHERS AND UNSATURATED DICARBOXYLIC ACID DERIVATIVES

BACKGROUND OF THE INVENTION

The present invention is concerned with co-polymers based on oxyalkyleneglycol alkenyl ethers and unsaturated dicarboxylic acid derivatives, with processes for the production thereof, as well as with the use of these co-polymers as additives for hydraulic binding agents, especially cement, for improving the properties of constructional materials produced therefrom during the working up and setting process.

It is known that additives in the form of dispersing agents are often added to aqueous slurries of powdered inorganic and organic substances, for example clays, porcelain slips, silicate meals, chalk, carbon black, powdered rock, pigments, talc, synthetic material powders and hydraulic binding agents, for improving the workability thereof, i.e. kneadability, coatability, extrudability, pumpability or flowability. These additives, which as a rule contain ionic groups, are able to break up agglomerates of solid materials, to disperse the particles formed and, in this way, to improve the workability especially of highly concentrated suspensions. This effect is specifically utilized also in the production of building material mixtures which contain hydraulic binding agents, for example cement, lime, gypsum or anhydrite.

In order to convert these building material mixtures based on the above-mentioned binding agents into a workable form which is ready for use, as a rule substantially more mixing water is necessary than would be necessary for the following hydration and setting process. The portions of hollow spaces formed by the excess water which subsequently evaporates leads to significantly impaired mechanical strengths and stabilities.

In order to reduce this excess amount of water in the case of a predetermined working-up consistency and/or to improve the workability in the case of a predetermined water/binding agent ratio, additives are used which, in general, are referred to as water reducing agents or superplasticizers. As such agents, there are, in particular, known polycondensation products based on naphthalene- or alkyl-naphthalene sulphonic acids (cf. EP-A-0 214 412) or sulphonic acid group-containing melamine-formaldehyde resins (cf. DE-PS 16 71 017).

Disadvantageous in the case of these additives is the fact that their outstanding liquefying action in especially concrete constructions remains only for a short period of time. The decrease of the workability of concrete mixtures (slump loss) in a short period of time can lead to problems especially where there is a great period of time between production and use of the fresh concrete, for example due to long conveying and transport paths.

An additional problem arises in the case of the use of such superplasticizers in mining and in inside places (gypsum plaster board hardening, production of precast concrete) where it can result in the liberation of toxic formaldehyde contained in the products due to the production process and thus can result in considerable working-hygienic pollution. For this reason, instead thereof, it has also already been attempted to develop formaldehyde-free superplasticizers for concrete from maleic acid monoesters and styrene, for example according to EP-A 0 306 449. With the help of these additives, the flow of concrete mixtures can be maintained for a sufficiently long period of time but the originally present very high dispersing action is lost very quickly after storage of the aqueous preparations of the superplasticizer due to the hydrolysis of the polymeric ester.

This problem does not occur in the case of superplasticizer of alkylpolyethyleneglycol allyl ethers and maleic anhydride according to EP-A 0 373 621. However, these products, like those previously described, are surface-active compounds which introduce undesirably high amounts of air pores into the concrete mixture which result in losses of the strength and stability of the hardened constructional material.

For this reason, it is necessary to add to the aqueous solutions of these polymer compounds anti-foaming agents, for example tributyl phosphate, silicone derivatives and various water-insoluble alcohols in a concentration range of 0.1 to 2% by weight, referred to the solids content. The mixing in of these components and the maintenance of a storage-stable homogeneous form of the corresponding formulations is very difficult to achieve even when these antifoaming agents are used in the form of emulsions.

Therefore, it is an object of the present invention to make available new polymer compounds which do not display the above-mentioned disadvantages according to the prior art but rather possess an excellent and long-lasting liquefying action, display a sufficient storage stability and, furthermore, do not have any properties resulting in the introduction of air pores so that in the case of the use of corresponding products the use of defoaming agents can be omitted.

THE INVENTION

The above stated object is obtained by the co-polymers of the invention. Surprisingly, it has been shown that the co-polymers according to the present invention based on oxyalkyleneglycol alkenyl ethers and unsaturated dicarboxylic acid derivatives possess an excellent liquefying action which can also be maintained over a sufficiently long period of time without hereby having a negative influence on the technical application properties of the corresponding hardened constructional materials or constructional material parts, such as strength and stability. Furthermore, the co-polymers according to the present invention have a good storage stability, which was also not foreseeable.

The co-polymer compounds according to the present invention consist of at least three components a), b) and c). The first component a) is an unsaturated dicarboxylic acid derivative of the general formula Ia or Ib:

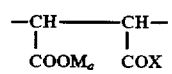

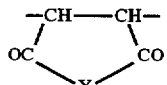

In the case of the dicarboxylic acid derivative of general formula Ia, M is a hydrogen atom, a mono- or divalent metal cation, an ammonium ion or an organic amine residue and a is 1 or, when M is a divalent cation, a is ½. Then, with a grouping $M_a$ containing a which is ½, there is given a bridge via M which, as $M_a$ with a=½, only exists theoretically.

As mono- or divalent metal cation, there is preferably used sodium, potassium, calcium or magnesium. As organic amine residues, there are preferably used substituted ammonium groups which are derived from primary, secondary or tertiary $C_1$-$C_{20}$-alkylamines, $C_1$-$C_{20}$-alkanolamines, $C_5$-$C_8$-cycloalkylemines and $C_6$-$C_{14}$-arylamines. Examples of appropriate amines include methylamine, dimethylamine, trimethylamine, ethanolamine, diethanolamine, triethanolamine, cyclohexylemine, dicyclohexylamine, phenylamine, diphenyl-amine in the protonated (ammonium) form. Furthermore, X also signifies —$OM_a$ or —O—$(C_mH_{2m}O)_n$—$R^1$, in which $R^1$ is a hydrogen atom or an aliphatic hydrocarbon radical containing 1 to 20 carbon atoms, a cycloaliphatic hydrocarbon radical containing 5 to 8 carbon atoms, an aryl radical containing 6 to 14 carbon atoms, which can possibly also be substituted, m is 2 to 4 and n is 0 to 100. The aliphatic hydrocarbon radicals can hereby be linear or branched, as well as saturated or unsaturated.

Preferred cycloalkyl radicals include cyclopentyl and cyclohexyl radicals and preferred aryl radicals include phenyl and naphthyl radicals, which can also be substituted, especially by hydroxyl, carboxyl or sulphonic acid groups. Alternatively, X can also be —$NHR^2$ and/or —$NR^2_2$ which corresponds to the mono- or disubstituted monoamides of the corresponding unsaturated dicarboxylic acid, in which $R^2$ can be identical to $R^1$ or instead can be —CO—$NH_2$.

Instead of the dicarboxylic acid derivatives corresponding to general formula Ia, the component a) (dicarboxylic acid derivative) can also be present in cyclic form corresponding to general formula Ib, in which case Y can be an oxygen atom (acid anhydride) or =$NR^2$ (acid imide) and $R^2$ has the above-given meaning.

In the second component corresponding to the general formula II:

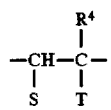   (II)

which is derived from oxyalkyleneglycol alkenyl ethers. $R^3$ is again a hydrogen atom or an aliphatic hydrocarbon radical containing from 1 to 5 carbon atoms (which can also be linear or branched and also unsaturated), p can have a value of from 0 to 3 and $R^1$, m and n have the above-given meanings. According to a preferred embodiment, in general formula II p can be 0 and m can be 2 or 3 so that the components are derived from polyethylene oxide or polypropylene oxidevinyl ethers.

The third component c) corresponds to the general formula:

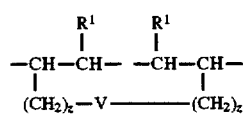

In general formula IIIa, $R^4$ can be a hydrogen atom or a methyl radical, depending upon whether it is an acrylic or methacrylic acid derivative. S can hereby be a hydrogen atom or a —$COOM_a$ or —$COOR^5$ radical, a and M have the above-given meanings and $R^5$ can be an aliphatic hydrocarbon radical containing 3 to 20 carbon atoms, a cycloaliphatic hydrocarbon radical containing 5 to 8 carbon atoms or an aryl radical containing 6 to 14 carbon atoms. The aliphatic hydrocarbon radical can also be linear or branched, saturated or unsaturated. The preferred cycloaliphatic hydrocarbon radicals are again cyclopentyl or cyclohexyl radicals and the preferred aryl radicals are the phenyl or naphthyl radicals.

When T is —$COOR^5$, S is —$COOM_a$ or —$COOR^5$. When T and S are —$COOR^5$, the corresponding components are derived from dicarboxylic acid esters.

Besides these ester structural units, component c) can also contain still other hydrophobic structural elements. These include polypropylene oxide and polypropylene oxide polyethylene oxide derivatives in which T is:

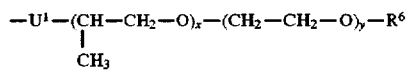

x hereby having a value of from 1 to 150 and y a value of from 0 to 15. The polypropylene oxide (polyethylene oxide) derivatives can hereby be attached via a grouping $U^1$ with the ethyl radical of component c) corresponding to general formula IIIa, whereby $U^1$ can be —CO—NH—, —O— or —$CH_2$—O—. These are thus the corresponding amide, vinyl or allyl ethers of the component corresponding to general formula IIIa. $R^6$ can hereby again be $R^1$ (for the meaning of $R^1$ see above) or

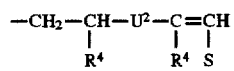

in which $U^2$ is —NH—CO—, —O— or —$OCH_2$— and S has the same meaning as above. These compounds are polypropylene oxide (polyethylene oxide) derivatives of the bifunctional alkenyl compounds corresponding to general formula IIIa.

As further hydrophobic structural element, the compounds of general formula IIIa can contain polydimethylsiloxane groups, T in general formula IIIa thereby being the group —W—$R^7$, in which W signifies the group:

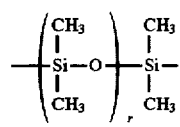

(in the following referred to as a polydimethylsiloxane grouping), $R^7$ can be the same as $R^1$ and r can have a value of from 2 to 100.

The polydimethylsiloxane grouping W can not only be attached directly to the ethylene radical according to general formula IIIa but also via the groupings

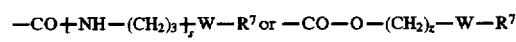

in which $R^7$ is preferably the same as $R^1$ and s is 1 or 2 and z is 0 to 4.

Furthermore, $R^7$ can also be one of the following radicals:

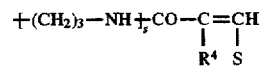

or

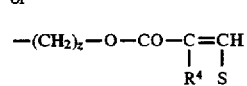

These are hereby the corresponding difunctional ethylene compounds corresponding to general formula IIIa which are connected to one another via the corresponding amide or ester groupings and whereby only one ethylene group has been co-polymerised.

It is also similar in the case of compounds according to general formula IIIa in which T is $$-(CH_2)_z-V-(CH_2)_z-CH=CH-R^1$$

in which z is 0 to 4, V is either a polydimethylsiloxane radical W or a $-O-CO-C_6H_4-CO-O-$ radical and $R^1$ has the above-given meaning. These compounds are derived from the corresponding dialkenylphenyldicarboxylic acid esters or dialkenyl-polydimethylsilozane derivatives.

In the scope of the present invention, it is also possible that not only one but rather both ethylene groups of the difunctional ethylene compounds have been co-polymerised. This corresponds substantially to a component of the following general formula:

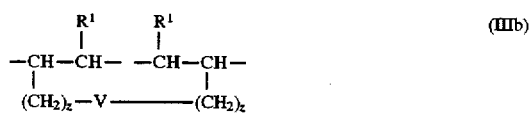
(IIIb)

in which $R^1$, V and z have the above-given meanings.

It is to be regarded as being important for the present invention that the co-polymers consist of 10 to 90 mol % of components of general formula Ia and/or Ib, 1 to 89 mol % of components of the general formula II and 0.1 to 10 mol % of components of general formula IIIa or IIIb. These co-polymers preferably consist of 40 to 55 mol % of components of general formula Ia and/or Ib, 40 to 55 mol % of components of general formula II and 1 to 5 mol % of components of general formula IIIa or IIIb. According to a preferred embodiment, a co-polymer according to the present invention additionally contains up to 50 mol %, especially of up to 20 mol %, referred to the sum of components a), b) and c), of components, the monomers of which are vinyl, acrylic acid or methacrylic acid derivatives.

The monomeric vinyl derivatives are preferably derived from a compound selected from the group consisting of styrene, ethylene, propylene, isobutene and vinyl acetate. As preferred monomeric acrylic acid derivative, the additional components are especially derived from acrylic acid or methylacrylate. The preferred monomeric methacrylic acid derivative is methacrylic acid, methyl methacrylate and hydroxyethyl methacrylate.

An especial advantage of the co-polymers according to the present invention is that the molar amounts of the structural units a) to c) can be adjusted in such a manner that, in the case of the corresponding co-polymers, a properly proportioned ratio of polar to non-polar groupings results, whereby a well-directed control of the surface-active properties of the corresponding products is possible.

The number of the repeating structural elements is hereby not limited but it has proved to be especially advantageous so to adjust the number of the structural elements that the co-polymers have an average molecular weight of 1000 to 200,000, whereby the desired molecular weight depends, primarily, on the nature of the inorganic binding agent (Portland cement, anhydrite, gypsum and the like) and the field of use (free flowing concrete, anhydrite floor screeds, gypsum plaster board production and the like).

Because of the change of hydrophilic and hydrophobic groups in the macromolecular structure, the aqueous compositions of the co-polymers according to the present invention show a turbidity point which preferably lies between 20° and 80° C. and can preferably be controlled as desired by the proportion of the structural element c).

The production of the co-polymers according to the present invention can take place in various ways. It is hereby important that 10 to 90 mol % of an unsaturated dicarboxylic acid derivative, 9 to 89 mol % of an oxyalkyleneglycol alkenyl ether and 0.1 to 10 mol % of a vinylic polyalkylene glycol, polysiloxane or ester compound are polymerised with the help of a radical initiator. As unsaturated carboxylic acid derivative which leads to the components of general formula Ia or Ib respectively, there are preferably used maleic acid, maleic acid monoesters, maleic acid monoamides, maleic acid ureides, maleic acid imides, as well as maleic anhydride but also fumaric acid.

Because of their hydrolytic stability in aqueous compositions, there are especially preferably used co-polymers based on maleic acid, maleic acid monoamides and ureides. Instead of maleic acid or fumaric acid, there can also be used mono- or divalent metal salts thereof, preferably sodium, potassium, calcium or magnesium salts, the ammonium salts thereof or the salts thereof with an organic amine residue. As maleic acid monoester, there is, above all, used an ester derivative the alcoholic component of which is a polyalkyleneglycol derivative of the general formula:

$$HO-(C_mH_{2m}O)_n-R^1$$

in which $R^1$ is a hydrogen atom, an aliphatic hydrocarbon radical (linear or branched or unsaturated) containing up to 20 carbon atoms, a cycloaliphatic hydrocarbon radical containing 5 to 8 carbon atoms or an optionally substituted aryl radical containing 6 to 14 carbon atoms, m is 2 to 4 and n is 0 to 100.

The preferred substituents in the aryl radical are hydroxyl, carboxyl or sulphonic acid groups. In the case of the maleic or fumaric acid monoamides, the radicals $R^2$ of the grouping $-NR^2_2$ are identical with $R^1$. The unsaturated dicarboxylic acid derivatives are preferably used in an amount of 40 to 55 mol %.

The second component important for the present invention for the production of the co-polymers according to the present invention is an oxyalkyleneglycol alkenyl ether which is preferably used in an amount of 40 to 55 mol %. In the case of the preferred oxyalkyleneglycol alkenyl ethers corresponding to the general formula:

$$CH_2=CR^3-(CH_2)_p-O-(C_mH_{2m}O)_n-R^1 \quad (IV)$$

$R^3$ is a hydrogen atom or an aliphatix hydrocarbon radical containing up to 5 carbon atoms and p is 0 to 3, $R^1$, m and n having the same meanings as above. The use of polyethyleneglycol monovinyl ether (p=0 and m=2), n thereby preferably having a value of from 2 to 15, has proved to be especially advantageous.

As third component for the introduction of the component c) which is important for the invention, here is preferably used 1 to 5 mol % of a vinylic polyalkyleneglycol, polysiloxane or ester compound. As preferred vinylic polyalkyleneglycol compounds, there are used derivatives of the general formula:

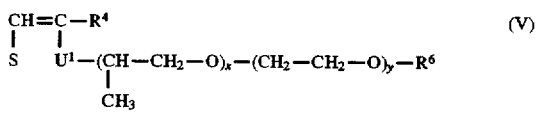
(V)

in which S can preferably be a hydrogen atom or $-COOM_a$ and $U^1$ $-CO-NH-$, $-O-$ or $-CH_2O-$, i.e. the acid amide, vinyl or allyl ethers of the corresponding polypropyleneglycol or polypropyleneglycol-polyethyleneglycol derivatives. The values for x are 1 to 150 and for y 0 to 15. $R^6$ can again either be $R^1$ or can signify a radical of the general formula:

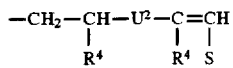

in which U² is —NH—CO—, —O— or —OCH₂— and S is —COOM$_a$ and preferably a hydrogen atom.

When R⁶=R¹ and R¹ is preferably a hydrogen atom, it is a question of the polypropyleneglycol (polyethyleneglycol) monoamides or ethers of the corresponding acrylic (S=H, R⁴=H), methacrylic (S=H, R⁴=CH₃) or maleic acid (S=—COOM$_a$, R⁴=H) derivatives. Examples of such monomers include maleic acid-N-(methylpolypropyleneglycol)-monoamide, maleic acid-N-(methoxy-polypropyleneglycol-poly ethyleneglycol)-monoamide, polypropyleneglycol vinyl ether and polypropyleneglycol allyl ether.

When R⁶ is not the same as R¹, it is a question of bifunctional vinyl compounds, the polypropyleneglycol-(polyethyleneglycol) derivatives of which are connected together via amide or ether groups (—O— or —OCH₂—). Examples of such compounds include polypropyleneglycol-bis-maleinamide acid, polypropyleneglycol diacrylamide, polypropyleneglycol dimethecrylamide, polypropyleneglycol divinyl ether and polypropyleneglycol diallyl ether.

As preferred vinylic polysiloxane compounds, there are used derivatives of the general formula:

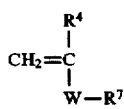

(VI)

in which R⁴ is a hydrogen atom or a methyl radical, W is a radical of the general formula:

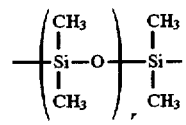

and r is 2 to 100. R⁷ preferably being the same as R¹. Examples for such monomers include the monovinylpolydimethylsiloxanes.

As further vinylic polysiloxane compounds, there can be used derivatives of the following general formula:

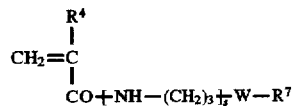

(VII)

in which s can be 1 or 2. R⁴ and W have the same meanings as above and R⁷ is either the same as R¹ or can be a radical of the general formula:

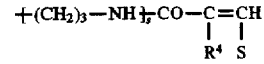

and S preferably represents a hydrogen atom.

Examples of such monomers with a vinyl function (R⁷=R¹) include polydimethylsiloxanepropylmaleinamide acid or polydimethylsiloxanedipropyleneaminomaleinamide acid. When R⁷ is not equal to R¹, it is a question of divinyl compounds, for example polydimethylsiloxane-bis-(propyl maleinamide acid) or polydimethylsiloxane-bis-(dipropyleneaminomaleinamide acid).

As further vinylic polysiloxane compound, there can be used a preferred derivative of the following general formula:

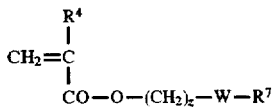

(VIII)

in which z can be from 0 to 4 and R⁴ and W have the above-given meanings. R⁷ can either be the same as R¹ or can be a radical of the general formula:

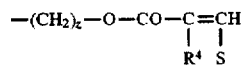

in which S is preferably a hydrogen atom. Examples of such monovinylic compounds (R⁷=R¹) include polydimethylsiloxane (1-propyl-3-acrylate) and polydimethylsiloxane (1-propyl-3-methacrylate).

When R⁷ is not the same as R¹, it is a question of divinyl compounds, for example polydimethylsiloxane-bis-(1-propyl-3-acrylate) or polydimethylsiloxane-bis-(1-propyl-3-methacrylate).

As vinylic ester compounds in the scope of the present invention, there are preferably used derivatives of the following general formula:

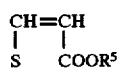

(IX)

in which S is —COOM$_a$ or —COOR⁵ and R⁵ can be an aliphatic hydrocarbon radical containing 3 to 20 carbon atoms, a cyclosliphatic hydrocarbon radical containing 5 to 8 carbon atoms, as well as an aryl radical containing 6 to 14 carbon atoms, a and M having the above-mentioned meanings. Examples of such ester compounds include di-n-butyl maleate and fumarate and mono-n-butyl maleate and fumarate.

Furthermore, there can also be used compounds of the following general formula:

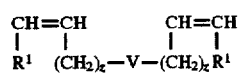

(X)

in which z can again be 0 to 4 and R¹ has the above-given meaning. V can hereby be the same as W (thus a polydimethylsiloxane grouping), which corresponds to dialkenylpolydimethylsiloxane compound, for example divinylpolydimethylsiloxane. Alternatively, V can also be —O—CO—C₆H₄—CO—O—. These compounds are dialkenylphthalic acid derivatives. A typical example for such a phthalic acid derivative is diallylphthalate.

The molecular weights of the compounds which form the component c) can be varied within wide limits and are preferably from 150 to 10,000.

According to a preferred embodiment, up to 50 mol % and especially up to 20 mol %, referred to the monomers, with the components of general formula I, II and III are polymerised in a vinyl, acrylic acid or methacrylic acid derivative. As monomeric vinyl derivative, there is preferably used styrene, ethylene, propylene, isobutene or vinyl acetate, as monomeric acrylic acid derivative there is preferably used acrylic acid or methylacrylate, whereas as monomeric methacrylic acid derivative there is, finally, preferred methacrylic acid methyl methacrylate and hydroxyethyl methacrylate.

The co-polymers according to the present invention can be produced according to the usual methods. It is an especial advantage that, according to the present invention, it is possible to work without the use of solvents or in aqueous solution. In both cases, the reactions can be carried out without the use of pressure and are, therefore, safe from a technical point of view.

If the process is carried out in aqueous solution, then the polymerisation takes place at 20° to 100° C. with the help of a conventional radical starter, the concentration of the aqueous solution preferably being adjusted to 30 to 50% by weight. According to a preferred embodiment, the radical polymerization can hereby be carried out in an acid pH range, especially at a pH value of from 4.0 to 6.5, in which case the conventional initiators, for example hydrogen peroxide, can be used without it resulting in a feared ether cleavage which would result in a great impairment of the yields.

In the case of the process according to the present invention, it is preferable to work in such a manner that the unsaturated dicarboxylic acid derivative is present in partly neutralised form in aqueous solution, preferably together with the polymerization initiator, and the other monomers are dosed in as soon as the necessary temperature has been achieved in the reaction vessels.

The polymerisation adjuvants, which can lower the activation threshold of the preferably peroxidic initiator, are added separately so that the co-polymerization can proceed at relative low temperatures. According to a further preferred embodiment, the unsaturated dicarboxylic acid derivative, as well as also the radical former, can be dosed in in separate or common inlets of the reaction vessel, whereby the problem of removal of heat can be solved in an ideal manner.

The nature of the used polymerization initiators and activators and of other adjuvants, for example chain transfer agents, is relatively uncritical, i.e. as initiators there can be used the usual radical donors, for example hydrogen peroxide, sodium, potassium or ammonium peroxodisulphate, tert.-butyl hydroperoxide, dibenzoyl peroxide, sodium peroxide, 2,2'-azo-bis-(2-amidinopropane) dihydrochloride, azo-bis-(isobutyronitrile) and the like. If redox systems are used, then the above-mentioned initiators are combined with reducing-acting activators. Examples of such reducing agents include ferrous (Fe(II)) salts, sodium hydroxymethanesulphinate dihydrate, alkali metal sulphites and metabisulphites, sodium hypophosphite, hydroxylamine hydrochloride, thiourea and the like.

An especial advantage of the co-polymers according to the present invention is that they can also be produced without the use of solvents, which can take place with the help of conventional radical starters at a temperature of from 60° to 150° C. For economic reasons, this variant can then especially be used when the co-polymers according to the present invention are to be supplied directly to their use according to the present invention because a laborious separation of the solvent, especially of water, for example by spray drying, can then be omitted.

The co-polymers according to the present invention are outstandingly suitable for aqueous suspensions, especially those based on inorganic binding agents, for example cement, lime and gypsum. They are hereby used in an amount of from 0.01 to 10% by weight, preferably of from 0.05 to 3% by weight, referred to the weight of the inorganic binding agent. The co-polymers hereby possess an excellent and long-lasting liquefying action without introducing large amounts of air pores into the corresponding binding agent mixture and without hereby having to take into account losses in the strength and stability of the hardened building material.

The following Examples are given for the purpose of illustrating the present invention:

EXAMPLE 1

270 g of water were placed in a reaction vessel equipped with a thermometer, a stirrer, a reflux condenser and two connections for separate inlets. While stirring, 32.7 g (0.334 mol) maleic anhydride and 25.0 g 50% aqueous sodium hydroxide solution were added thereto, the temperature thereby being kept below 30° C. by cooling. Subsequently, 100 mg iron sulphate heptahydrate, as well as 18.5 g 30% hydrogen peroxide, were added thereto while stirring and, from separate supply vessels, on the one-hand a solution of 5.1 g sodium hydroxymethane-sulphinate dihydrate and 12.5 g of water (feed 1) was added thereto over the course of 75 minutes and, on the other hand, a solution of 155 g (0.310 mol) methyl polyethyleneglycol monovinyl ether (M.W. 500) and 12.1 g (0.006 mol) polypropyleneglycol bis-maleinamide acid (M.W. 2000) (feed 2) over the course of 60 minutes.

After completion of the addition, stirring was continued for 30 minutes at 35° C. and the reaction mixture then cooled to 25° C. A pH value of 7.60 was adjusted by the addition of 56.3 g of 20% aqueous sodium hydroxide solution. There were obtained 583 g of a yellow coloured, turbid aqueous composition which has a solids content of 37.4% by weight.

EXAMPLE 2

The procedure was as described in Example 1 but with the following composition of the vinyl ether feed (feed 2):

155.0 g (0.310 mol) methylpolyethyleneglycol monovinyl ether (M.W. 500)

7.4 g (0.001 mol) polydimethylsiloxane-bis-(dipropyleneaminomaleinamide acid (M.W. 5400)

At the end of the addition, the reaction mixture had a pH value of 5.02 and was subsequently neutralized with 20% aqueous sodium hydroxide solution (58.3 g). 35.5% by weight of solids were found in the end product.

EXAMPLE 3

Example 1 was repeated with the following components in feed 2:

116.0 g (0.232 mol) methylpolyethyleneglycol-monovinyl ether (M.W. 500)

9.1 g (0.0875 mol) styrene 5.2 g (0.0026 mol) polypropyleneglycol-bis-maleinamide acid (M.W. 2000)

The water-dispersed reaction product obtained after neutralization with 20% aqueous sodium hydroxide solution was free of residual monomeric styrene and had a solids content of 33.7% by weights

EXAMPLE 4

160 g of water and 55.2 g (0.175 mol) N-(4-sulphophenyl)-maleic acid monoamide disodium salt were placed in the reactor described in Example 1. While stirring, there were successively added thereto 1.5 g (0.015 mol) maleic anhydride, 50 mg iron sulphate heptahydrate and 9.3 g 30% hydrogen peroxide. After adjustment of a reaction temperature of 26° C., there were introduced from separate inlets a solution of 2.6 g sodium hydroxymethanesulphinate dihydrate in 6.3 g of water over a period of time of 75 minutes and a mixture of 77 g (0.154 mol) methylpolyethyleneglycol monovinyl ether (M.W. 500) and 2.5 g (0.001 mol) polypropyleneglycol-bis-maleinamide acid (M.W. 2000) over a period of time of 60 minutes. After completion of the addition, the reaction mixture was stirred for 30 minutes at 35° C., cooled to 25° C. and a pH value of 7.50 adjusted by the addition of 9.59 g 20% aqueous sodium hydroxide solution.

There were obtained 591 g of a dark, turbid mixture with a solids content of 37.5% by weight.

EXAMPLE 5

Example 1 was repeated but, instead of polypropyleneglycol-bis-maleinamide acid (M.W. 2000), in feed 1 there was used a reaction product of polymethoxypropylene oxide-block-ethylene oxide-block-propyleneglycolamine (32 PO+3 EO)of average molecular weight of 2000 g/mol with maleic anhydride in an amount of 3.5 g (0.0018 mol)(amount of solids in the end product: 36.4% by weight, weighed out amount: 591 g).

EXAMPLE 6

Example 5 was repeated with a reaction product of a monofunctional ethyleneglycol/propyleneglycol amine (9 PO+1 EO) of average molecular weight of 600 g/mol with maleic anhydride. The light brown colored end product had a solids content of 36.2% by weight.

EXAMPLE 7

The procedure was analogous to that described in Example 1 but with the following composition of feed 2:

155.0 g (0.310 mol) methylpolyethyleneglycol monovinyl ether (M.W. 500)

1.6 g (0.016 mol) maleic anhydride 5.6 g (0.025 mol) maleic acid di-n-butyl ester After neutralization, there remained 590 g of a yellowish colored, slightly turbid aqueous solution with a solids content of 36.5% by weight.

EXAMPLE 8

Instead of the maleic acid di-n-butyl ester there used, Example 7 was repeated with 5.6 g (0.023 mol) phthalic acid diallyl ester. There were obtained 595 g of a very turbid emulsion of the co-polymer with a solids content of 36.5% by weights

EXAMPLE 9

A co-polymer was produced from:

18.2 g (0.186 mol) maleic anhydride 92.7 g (0.169 mol) polyethyleneglycol-monoalkyl ether (M.W. 550) and 4.0 g (0.002 mol) polypropyleneglycol-bis-maleinamide acid (M.W. 2000)

in aqueous solution. In contradistinction to the procedure described in Examples 1 to 8, the oxyalkylene ether was taken as a whole and not dosed in as there. The brown turbid end product contained 29.4% by weight of solids.

EXAMPLE 10

Analogously to Example 9, a co-polymer as produced from 18.2 g (0.186 mol) maleic anhydride 46.4 g (0.084 mol) polyethyleneglycol-monoalkyl ether (M.W. 550)

4.0 g (0.002 mol) polypropyleneglycol-bis-maleinamide acid (M.W. 2000) and 8.8 g (0. 084 mol) styrene in aqueous solution. A yellow aqueous solution was obtained with a solids content of 31.7% by weight.

EXAMPLE 11

A co-polymer was synthesized from 150.0 g (0.300 mol) methylpolyethyleneglycol-monovinyl ether (M.W. 500)

32.7 g (0.334 mol) maleic anhydride and 5.5 g (0.005 mol) polydimethylsiloxane-bis-(1-propyl-3-methacrylate)(M.W. 1100)

according to a solvent-free variant of the process, using azo-diisobutyric acid nitrile as initiator. The product, which was obtained in the form of a highly viscous turbid melt, was diluted by the addition of 245 g of water and adjusted to a pH value of 7.40 by the addition of 74.6 g of 20% aqueous sodium hydroxide solution. A dark brown aqueous solution was obtained with a solids content of 37.7% by weight.

EXAMPLE 12

According to a solvent-free variant of the process according to Example 11, a co-polymer was produced from 150.0 g (0.300 mol) methylpolyethyleneglycol-monovinyl ether (M.W. 500) and 32.7 g (0.334 mol) maleic anhydride which was reacted in a polymer-analogous reaction with 9.1 g (0.005 mol) polymethoxypropylene-block-ethylene-block-propyleneglycolamine (32 PO+3 EO)(M.W. 2000)

at 90° C.

After the product has been diluted with water and neutralized with aqueous sodium hydroxide solution, there remained a dark red-colored, turbid solution with a solids content of 39.0% by weight.

EXAMPLE 13

Example 12 was repeated with 9.1 g (0.015 mol) of an amine-terminated monofunctional block co-polymer of 9 PO units and one EO unit (M=600 g/mol).

The solids content of the red-brown turbid solution obtained amounted to 38.7% by weight.

EXAMPLE 14

Instead of the block co-polymer used in Example 12, there were used 9.1 g (0005 mol) of a difunctional polyoxypropyleneglycolamine (M.W. 2000). The dark brown colored end product contained 39.6% by weight solids.

EXAMPLE 15

In a solvent-free variant of the process, 116.9 g (0.334 mol) methylpolyethyleneglycol-monoalkyl ether (M.W. 350) and 32.7 g (0.334 mol) maleic anhydride were polymerized at a reaction temperature of 90° C. by adding the monomers continously and, subsequently thereto, then reacted at 95° C. with 2.5 g (0.0025 mol) polydimethylsiloxane-bis-(1-propyl-3-amine)(M.W. 1000). A golden yellow polymer melt resulted which, after cooling to ambient temperature, was diluted with water and neutralized with aqueous sodium hydroxide solution. The bright yellow aqueous solution of the end product contained 35.2% by weight of solids.

Comparison Example 1

Commercial superplasticizer Melment L 10 (SKW Trostberg AG) based on a sulphonated melamineformaldehyde polycondensate.

Comparison Example 2

Commercially available superplasticizer LOMAR D (Henkel KGaA) for building material mixtures containing hydraulic binding agents based on a naphthalenesulphonic acid-formaldehyde polycondensation product.

Comparison Example 3

Commercially available co-polymer Narlex LD 36 V (National Starch & Chemical Ltd.) based on a co-polymer of acrylic acid/acrylic acid hydroxyalkyl ester.

Comparison Example 4

Maleic acid mono ester-styrene co-polymer with the trade name POZZOLITH 330 N (MBT Sandoz AG).

Comparison Example 5

Example 1 was repeated but without the polypropyleneglycol-bis-maleinamide acid (M.W. 2000) there used.

The aqueous co-polymer compositions were subjected to a comparative testing as superplasticizers for cement-containing solids suspensions in order to demonstrate their improved properties in comparison with conventional flow agents.

Application Example 1

900 g Portland cement PC 35 Kiefersfelden were mixed in a standardized manner with 1350 g standardized sand (coarse amount:fine amount=2:1) and 405 g of water (water-cement ratio=0.45) which contained the products according to the present invention or the comparison products in dissolved form. Depending upon the effectiveness of the individual products, the dosaging was so chosen that comparable consistencies resulted.

The flow values of the cement mortars were determined over a period of time of 60 minutes. For this purpose, there was used a stainless steel flow trough of 80 cm length with a filling funnel (1000 ml filling amount).

The liquefying action of a superplasticizer is the better the greater is the path which is covered by a constant amount of fresh mortar within a period of time of 120 seconds after opening the filling funnel. At the same time, a determination of the air content is carried out on the building material mixtures produced.

The results of these comparative testings are summarised in the following Table 1.

TABLE 1

| additive of Example | solids (wt. %) | dosage (wt. %)[1] | flow value after 10 min. | 30 min. | 60 min. | air (vol. %) |
|---|---|---|---|---|---|---|
| 1 | 37.4 | 0.20 | 540 | 540 | 540 | 2.9 |
| 2 | 35.5 | 0.20 | 590 | 600 | 600 | 3.7 |
| 3 | 33.7 | 0.20 | 570 | 560 | 530 | 3.0 |
| 4 | 37.6 | 0.20 | 510 | 470 | 460 | 3.0 |
| 5 | 36.4 | 0.20 | 560 | 560 | 550 | 3.4 |
| 6 | 36.2 | 0.20 | 570 | 560 | 560 | 3.6 |
| 7 | 36.5 | 0.20 | 620 | 620 | 610 | 3.4 |
| 8 | 36.5 | 0.20 | 600 | 620 | 600 | 4.3 |
| 9 | 29.4 | 0.25 | 560 | 560 | 560 | 3.0 |
| 10 | 31.7 | 0.25 | 560 | 520 | 500 | 3.0 |
| 11 | 37.7 | 0.20 | 600 | 680 | 700 | 3.5 |
| 12 | 39.0 | 0.20 | 650 | 660 | 660 | 2.9 |
| 13 | 38.7 | 0.20 | 630 | 630 | 630 | 2.9 |
| 14 | 39.6 | 0.20 | 600 | 600 | 600 | 3.2 |
| 15 | 35.2 | 0.20 | 570 | 570 | 560 | 4.2 |
| comp. 1 | 40.5 | 0.50 | 340 | 220 | 190 | 1.8 |
| comp. 2 | 37.0 | 0.50 | 570 | 520 | 410 | 3.7 |
| comp. 4 | 33.3 | 0.25 | 580 | 520 | 490 | 2.9 |
| comp. 5 | 35.8 | 0.20 | 580 | 590 | 590 | 10.9 |

W/C = 0.45
[1] referred to cement content PC 35 K,efersfelden

Application Example 2

5.3 kg Portland cement (PC 35 Kiefersfelden) are mixed with 33.0 kg of aggregates (sieve line 0 to 32 mm) and 2.65 kg of water (less the water of the additives) in a standard way in a concrete forced circulation mixer. The aqueous solutions of the products according to the present invention or of the comparison products were added thereto and 10 or 30 minutes, respectively, after the addition of the superplasticizer the flow table spreads were measured according to German Industrial Standard DIN 1048 (double determinations).

Subsequent to the measurement of the flow table spreads specimens with dimensions of 15×15×15 cm were prepared and the compressive strength was determined after 24 hours, as well as the proportion of air pores.

The results obtained are summarised in the following Table 2.

TABLE 2

(Concrete testing according to DIN 1048)

| additive of Example | dosage (wt. %)[1] | flow table spread after 10 min. | 30 min. | bulk density (kg/m$^3$) | air (vol. %) | 24 h. strength (N/mm$^2$) |
|---|---|---|---|---|---|---|
| 1 | 0.24 | 560 | 500 | 2.48 | 2.0 | 9.6 |
| 2 | 0.22 | 575 | 515 | 2.46 | 2.8 | 7.8 |
| 3 | 0.24 | 555 | 495 | 2.47 | 2.4 | 8.8 |
| 4 | 0.26 | 550 | 545 | 2.49 | 1.6 | 9.6 |
| 5 | 0.22 | 560 | 510 | 2.47 | 2.5 | 9.4 |
| 6 | 0.22 | 570 | 500 | 2.46 | 2.7 | 9.0 |
| 7 | 0.23 | 575 | 495 | 2.45 | 3.2 | 8.3 |
| 8 | 0.25 | 575 | 500 | 2.49 | 1.8 | 7.9 |
| 9 | 0.26 | 555 | 520 | 2.46 | 2.8 | 7.7 |
| 10 | 0.26 | 550 | 500 | 2.47 | 2.6 | 9.3 |
| 11 | 0.21 | 585 | 520 | 2.45 | 3.4 | 9.8 |
| 12 | 0.20 | 580 | 525 | 2.48 | 2.0 | 10.5 |
| 13 | 0.20 | 580 | 530 | 2.49 | 1.5 | 9.9 |
| 14 | 0.21 | 575 | 515 | 2.47 | 2.5 | 9.4 |
| 15 | 0.20 | 540 | 550 | 2.45 | 3.3 | 6.4 |
| comp. 1 | 0.46 | 545 | 455 | 2.50 | 1.1 | 14.5 |
| comp. 2 | 0.37 | 540 | 385 | 2.50 | 1.5 | 16.4 |
| comp. 3 | 0.23 | 540 | 435 | 2.46 | 2.8 | 10.6 |
| comp. 5 | 0.24 | 555 | 485 | 2.35 | 7.1 | 5.0 | water/cement (W/C) = 0.50
[1] referred to cement content of PC 35 Kiefersfelden

It will be understood that the specification and examples are illustrative but not limitative of the present invention and that other embodiments within the spirit and scope of the invention will suggest themselves to those skilled in the art.

We claim:

1. A co-polymers based on oxyalkyleneglycol-alkenyl ethers and unsaturated dicarboxylic acid derivatives, comprising a) 10 to 90 mol % of component of the formula: Ia and/or Ib:

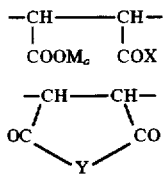

in which M is a hydrogen atom, a mono- or divalent metal cation, an ammonium ion or an organic amine residue, a is 1 or, when M is a divalent metal cation, is ½, X is also —$OM_a$ or —O—$(C_mH_{2m}O)_n$—$R^1$, in which $R^1$ is a hydrogen atom, an aliphatic hydrocarbon radical containing from 1 to 20 carbon atoms, a cycloaliphatic hydrocarbon radical containing 5 to 8 carbon atoms or an optionally substituted aryl radical containing 6 to 14 carbon atoms, m is 2 to 4, n is 0 to 100, —$NHR^2$ and/or —$NHR^2_2$, in which $R^2=R^1$ or —CO—$NH_2$, as well as Y is an oxygen atom or —$NR^2$, b) 1 to 89 mol % of components of the general formula:

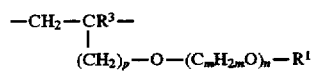

in which $R^3$ is a hydrogen atom or an aliphatic hydrocarbon radical containing from 1 to 5 carbon atoms, p is 0 to 3 and $R^1$, m and n have the above-given meanings, as well as c) 0.1 to 10 mol % of components of the general formulae:

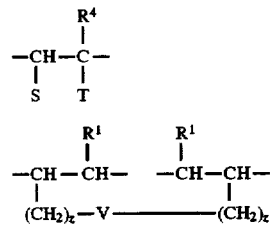

in which S is a hydrogen atom or —$COOM_a$ or —$COOR^5$, T is a radical of the general formula:

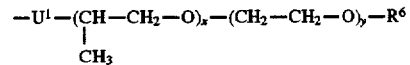

—$(CH_2)_z$—V—$(CH_2)_z$—CH=CH—$R^1$ or —$COOR^5$ or, when S is —$COOR^5$ or —$COOM_a$, $U^1$ is —CO—NHM—, —O— or —$CH_2O$, $U^2$ is —NH—CO—, —O— or —$OCH_2$, V is —O—CO—$CE_6H_4$—CO—O— or —W— and W is

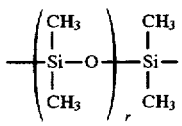

$R^4$ is a hydrogen atom or a methyl radical, $R^5$ is an aliphatic hydrocarbon radical containing 3 to 20 carbon atoms, a cycloaliphatic hydrocarbon radical containing 5 to 8 carbon atoms or an aryl radical containing 6 to 14 carbon atoms, $R^6=R^1$.

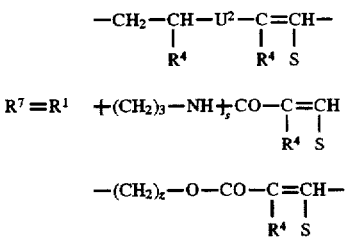

r is 2 to 100, s is 1 or 2, x is 1 to 150, y is 0 to 15 and z is 0 to 4.

2. The co-polymer of claim 1, comprising 40 to 55 mol % of a component of general formula Ia and/or Ib; 40 to 55 mol % of a component of general formula II; and 1 to 5 mol % of a component of the general formula IIIa or IIIb.

3. The co-polymer of claim 1, wherein M is a mono- or divalent metal cation selected from the group consisting of sodium, potassium, calcium and magnesium ions.

4. A co-polymer of claim 1, wherein $R^1$ is a phenyl radical, optionally substituted by hydroxyl, carboxyl or sulfonic acid groups.

5. A co-polymer of claim 1, wherein p is 0 and m is 2 in general formula II.

6. The co-polymer of claim 1, further comprising up to 50 mol % and especially up to 20 mol %, referred to the sum of the components of the general formulae I, II and III, of components, the monomers of which are vinyl, acrylic acid or methacrylic acid derivatives.

7. The co-polymer of claim 6, wherein the monomeric vinyl derivative is selected from styrene, ethylene, propylene, isobutene or vinyl acetate.

8. The co-polymer of claim 6, wherein the monomeric acrylic acid derivative is acrylic acid or methyl acrylate.

9. The co-polymer of claim 6, wherein the monomeric methacrylic acid derivative is selected from methacrylic acid, methyl methacrylate or hydroxyethyl methacrylate.

10. The co-polymer of claim 1, having an average molecular weight of from 1,000 to 200,000.

11. A co-polymer produced by the process of claim 1.

* * * * *